(12) United States Patent
Landin

(10) Patent No.: US 8,297,252 B1
(45) Date of Patent: Oct. 30, 2012

(54) ROTARY ONE CYCLE INTERNAL COMBUSTION ENGINE

(76) Inventor: Pedro Julio Landin, Miami, FL (US)

( * ) Notice: Subject to any disclaimer, the term of this patent is extended or adjusted under 35 U.S.C. 154(b) by 643 days.

(21) Appl. No.: 12/507,833

(22) Filed: Jul. 23, 2009

(51) Int. Cl.
| | |
|---|---|
| F02B 53/00 | (2006.01) |
| F02B 53/04 | (2006.01) |
| F01C 1/00 | (2006.01) |
| F04C 18/00 | (2006.01) |
| F04C 2/00 | (2006.01) |

(52) U.S. Cl. ........ 123/241; 123/229; 123/228; 123/244; 418/246

(58) Field of Classification Search ................ 123/241, 123/243–244, 246, 228–229, 237; 418/196, 418/57
See application file for complete search history.

(56) References Cited

U.S. PATENT DOCUMENTS

| | | | | |
|---|---|---|---|---|
| 1,348,103 | A * | 7/1920 | George ........................ | 123/237 |
| 1,350,231 | A * | 8/1920 | McFarland ................... | 123/229 |
| 2,116,897 | A * | 5/1938 | Dove ............................ | 123/248 |
| 3,902,829 | A * | 9/1975 | Burrowes .................... | 123/229 |
| 3,912,429 | A * | 10/1975 | Stevenson ................... | 418/246 |
| 3,941,527 | A * | 3/1976 | Allington .................... | 418/196 |
| 4,106,472 | A * | 8/1978 | Rusk ............................ | 123/243 |
| 4,274,374 | A * | 6/1981 | Lee .............................. | 123/241 |
| 4,431,327 | A * | 2/1984 | Mazzagatti .................. | 418/57 |
| 6,062,188 | A * | 5/2000 | Okamura ..................... | 123/228 |
| 6,955,153 | B1 * | 10/2005 | Peitzke et al. .............. | 123/241 |
| 7,308,884 | B2 * | 12/2007 | Tathuzaki et al. .......... | 123/241 |
| 8,061,327 | B2 * | 11/2011 | Zink et al. ................... | 123/244 |
| 2011/0139116 | A1 * | 6/2011 | Herbruck ..................... | 123/244 |

* cited by examiner

Primary Examiner — Thai Ba Trieu
(74) Attorney, Agent, or Firm — Albert Bordas, P.A.

(57) ABSTRACT

A rotary internal combustion engine including a rotor assembly and a shaft, whereby the rotor assembly is mounted upon the shaft. The rotary internal combustion engine also includes a first vane assembly and a second vane assembly. A casing assembly houses the rotor assembly. In addition, a cooling system includes first and second sides. The cooling system houses the casing assembly. Furthermore, a first plate assembly mounts onto the casing assembly and the cooling system at the first side, and a second plate assembly mounts onto the casing assembly and the cooling system at the second side.

15 Claims, 16 Drawing Sheets

ROTARY ONE CYCLE INTERNAL COMBUSTION ENGINE

BACKGROUND OF THE INVENTION

1. Field of the Invention

The present invention relates to internal combustion engines, and more particularly, to rotary internal combustion engines.

2. Description of the Related Art

Several rotary internal combustion engines have been developed in the past, which provide for a number of more or less complicated features that fail to solve the problem in an efficient and economical way. None of these engines, however, suggests a rotary internal combustion engine with the novel features of the present invention.

SUMMARY OF THE INVENTION

The instant invention is a rotary internal combustion engine, comprising a rotor assembly and a shaft. The rotor assembly is mounted upon the shaft. The instant invention also comprises a first vane assembly and a second vane assembly. A casing assembly houses the rotor assembly. In addition, a cooling system comprises first and second sides. The cooling system houses the casing assembly. Furthermore, a first plate assembly mounts onto the casing assembly and the cooling system at the first side, and a second plate assembly mounts onto the casing assembly and the cooling system at the second side.

The rotor assembly comprises a lateral wall extending from a first edge to a second edge. The rotor assembly further comprises a front wall and a rear wall. The front and rear walls spaced apart from each other by the lateral wall. The rotor assembly further comprises a central opening to receive the shaft therethrough. The rotor assembly comprises first and second elongated channels to deliver a lubricant, and a cutout defined by the first and second edges.

The cutout is of cooperative shape and dimensions to receive the first vane assembly. The casing assembly comprises a valve block of cooperative shape and dimensions to receive the second vane assembly. The casing assembly further comprises an exterior circular surface and an interior circular surface. The lateral wall does not contact the interior circular surface to define a chamber. The first vane assembly comprises an elongated body having a protruding lip with a distal end that makes contact with the interior circular surface. The shaft has first and second ends and trespasses the first and second plate assemblies. The present invention further comprises an intake check valve. The intake check valve allows a fuel-air mixture to be drawn in the chamber. An exhaust, which is always open, allows burned gases of the fuel-air mixture to escape from in between the chamber. The fuel-air mixture may comprise air mixed with any combustious gas such as hydrogen, methane, diesel, or gasoline.

Ignition means ignite the fuel-air mixture in the chamber. Timing means time when to ignite the fuel-air mixture in the chamber after the first vane assembly engages the second vane assembly a first time but before engaging the second vane assembly a second time. This cycle repeats. The first vane assembly swivels within the cutout, and the second vane assembly swivels within the valve block. The shaft comprises a first non-circular section that matches a second non-circular section of the rotor assembly.

Lubrication means lubricate the rotor assembly, the lateral wall, and the interior circular surface with the lubricant as the rotor assembly rotates with the shaft. The lubrication means includes centrifugal forces caused by the rotor assembly rotating with the shaft to cause the lubricant entering through an oil inlet to seep through the first and second elongated channels. The first vane assembly comprises an elongated body having a protruding lip with a distal end, and the second vane assembly comprises a first elongated body having first and second protruding lips with respective first and second distal ends.

It is therefore one of the main objects of the present invention to provide a rotary internal combustion engine that is mounted onto a central shaft.

It is another object of this invention to provide a rotary internal combustion engine that is of durable and reliable construction.

It is yet another object of this invention to provide such an engine that is inexpensive to manufacture and maintain being fuel efficient while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
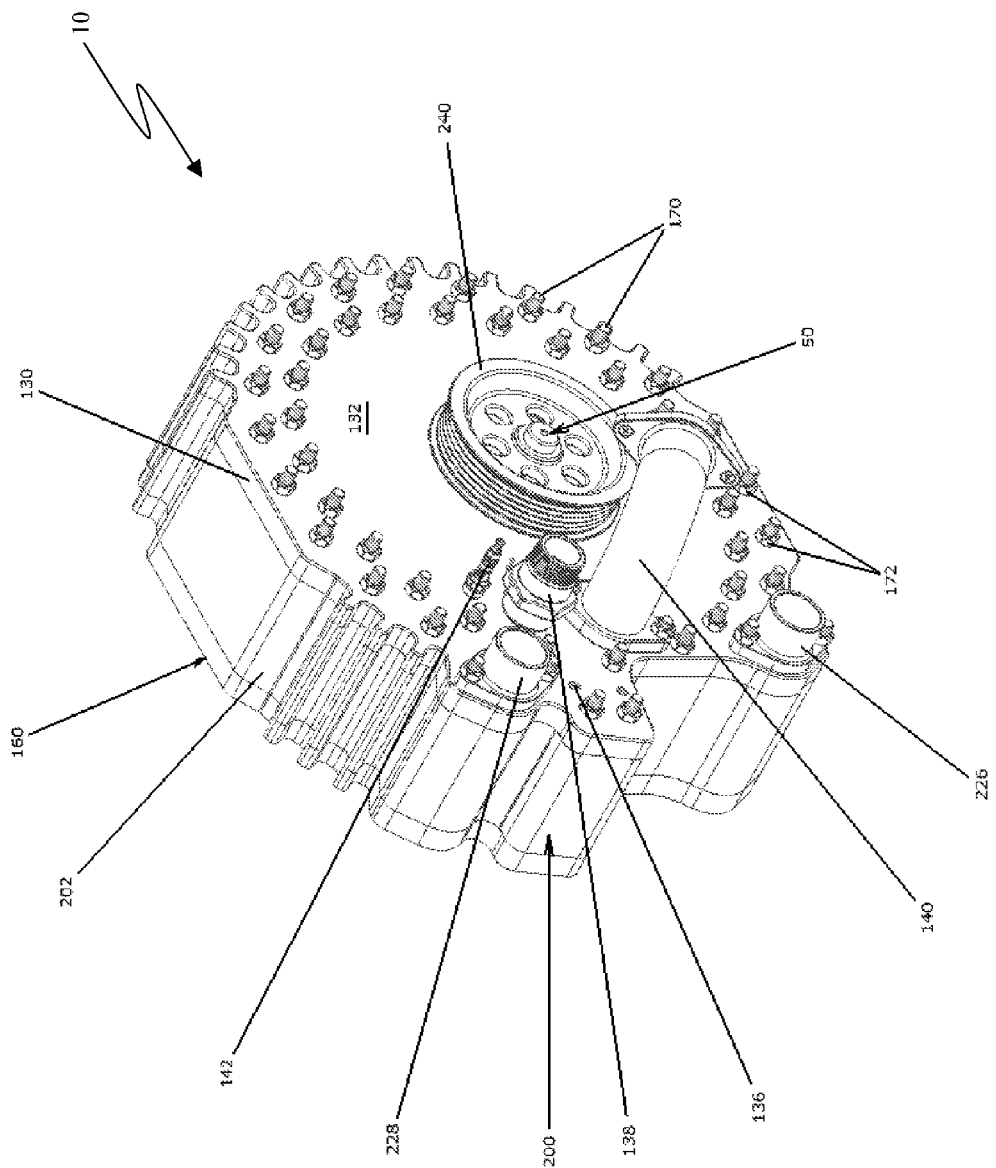
FIG. 1 represents an isometric view of the instant invention.

Referring now to the drawings, the present invention is generally referred to with numeral 10. It can be observed that it basically includes rotor assembly 20, shaft 50, vane assemblies 70 and 90, casing assembly 110, front plate assembly 130, rear plate assembly 160, and cooling system 200.

Figure 2A:
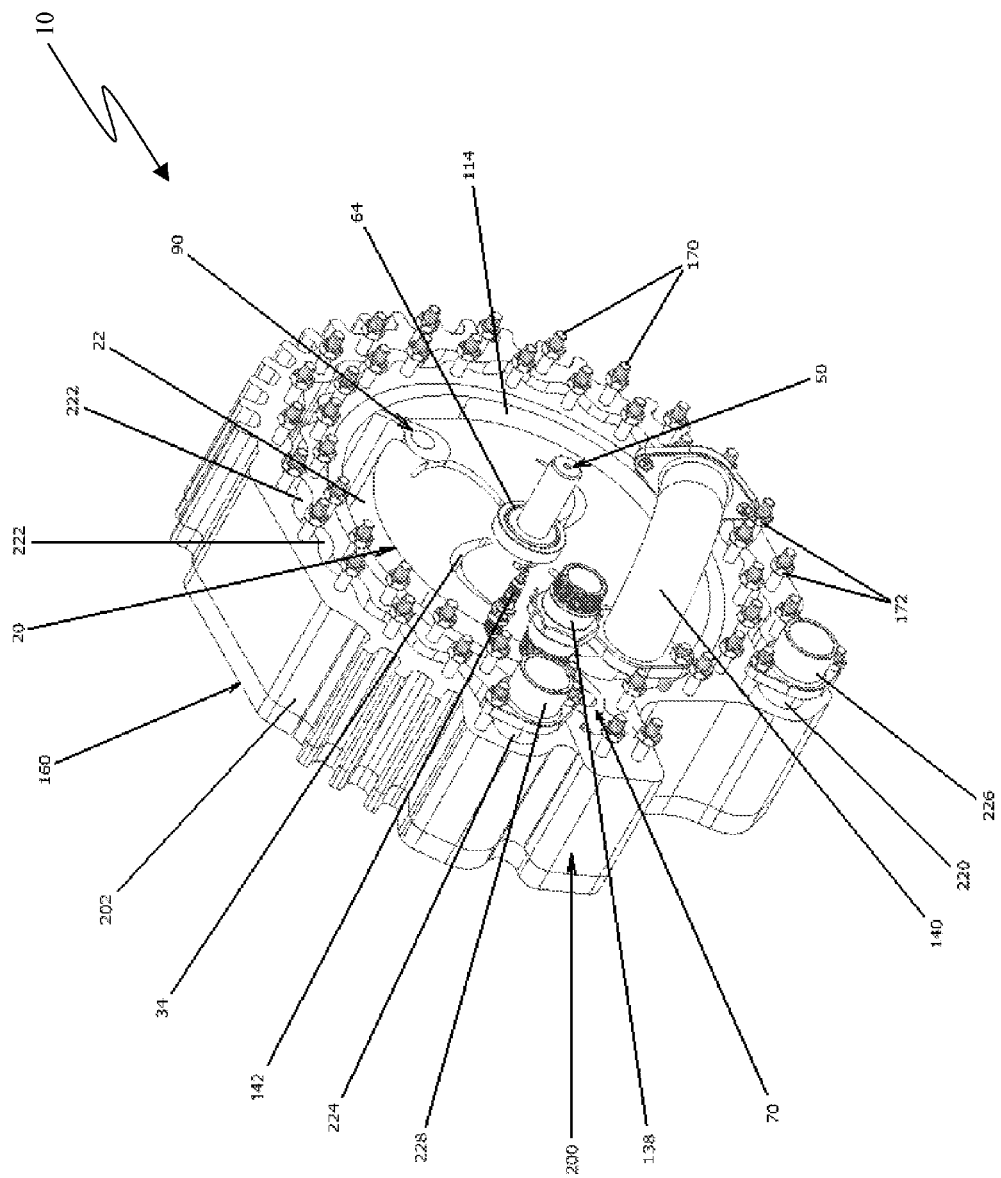
FIG. 2A is a first isometric view of the instant invention as shown in FIG. 1, without a front plate assembly.
Figure 2B:
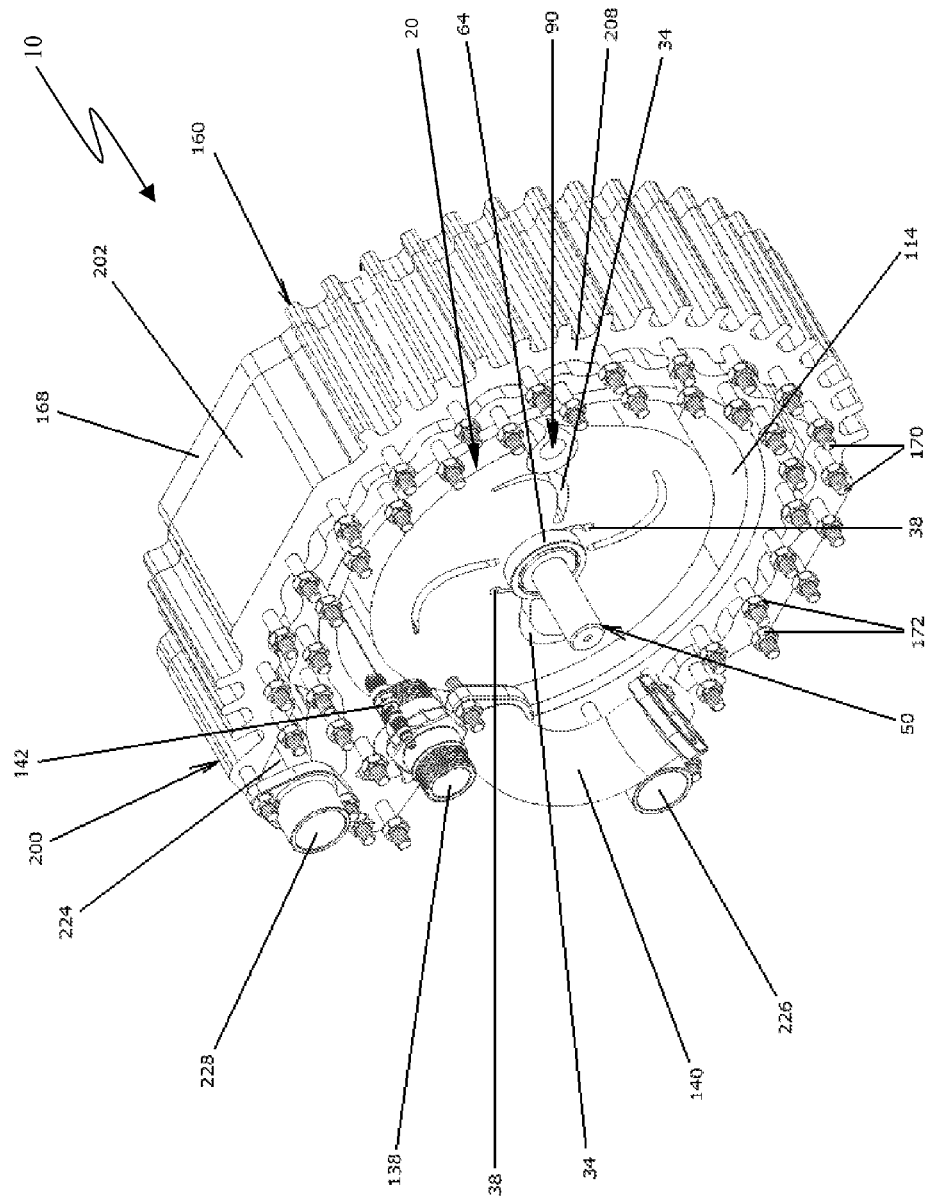
FIG. 2B is a second isometric view of the instant invention as shown in FIG. 1, without the front plate assembly.

As seen in FIGS. 1, 2A, and 2B, instant invention 10 is a rotary internal combustion engine. Instant invention 10 may drive various vehicle components and or accessories. As an example, shaft 50 may drive pulley 240. It is noted that front plate assembly 130 is not illustrated in FIGS. 2A and 2B to better illustrated the internal components of instant invention 10.

Figure 3A:
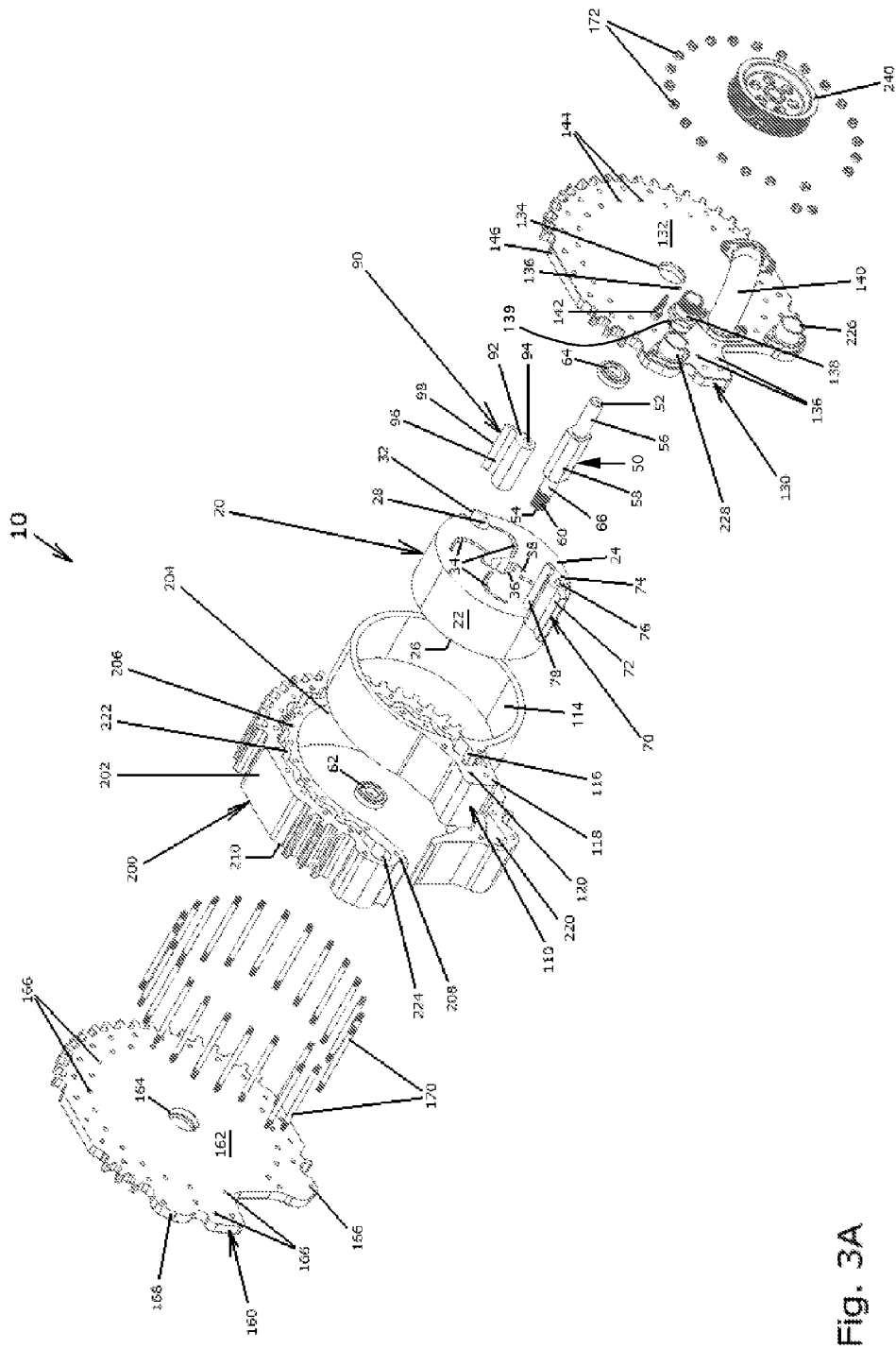
FIG. 3A is a first exploded view of the instant invention.
Figure 3B:
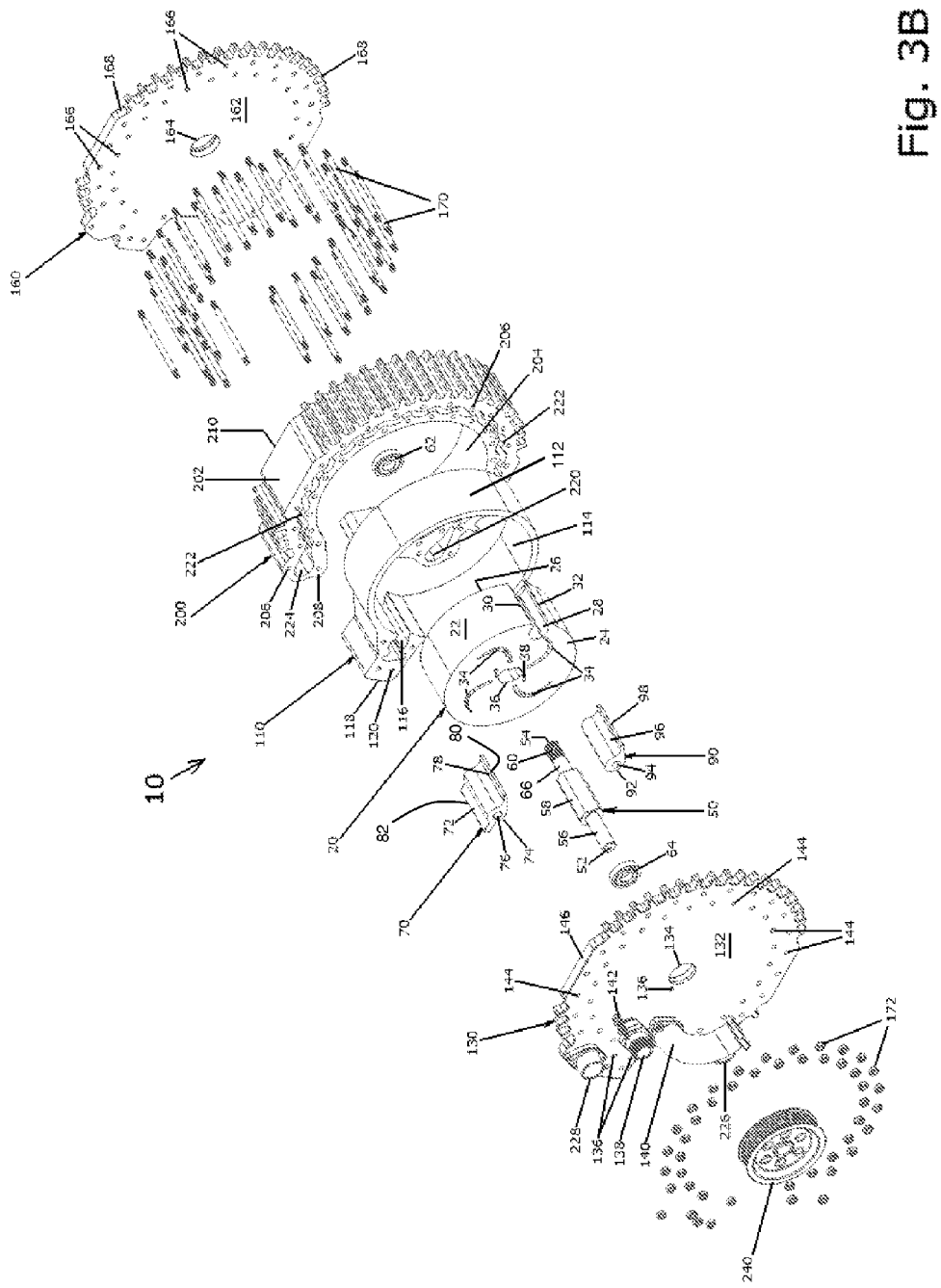
FIG. 3B is a second exploded view of the instant invention.

As best seen in FIGS. 3A and 3B, instant invention 10 comprises rotor assembly 20. Rotor assembly 20 comprises lateral wall 22 that extends from first edge 30 to second edge 32. Rotor assembly 20 further comprises front wall 24 and rear wall 26. Front wall 24 and rear wall 26 are spaced apart from each other by lateral wall 22. Rotor assembly 20 further comprises central opening 36 to receive shaft 50 therethrough. Cutout 28 is defined by first edge 30 and second edge 32, and is of cooperative shape and dimensions to receive first vane assembly 90, whereby first vane assembly 90 swivels within cutout 28. Rotor assembly 20 further comprises first elongated channels 34 and second elongated channels 38 to deliver a lubricant, such as engine oil.

Rotor assembly 20 is mounted upon shaft 50. In the preferred embodiment, rotor assembly 20 is perfectly balanced with a center of gravity. Shaft 50 comprises ends 52 and 54. From end 52, shaft 50 comprises circular section 56 that extends to shaped section 58. In the preferred embodiment, shaped section 58 is defined as a first non-circular section that matches a second non-circular section defined by central opening 36 of rotor assembly 20. From shape section 58, shaft 50 comprises circular section 66 that extends to section 60. In the preferred embodiment, section 60 has a pinion or grooved shape. Shaft 50 also comprises bearings 62 and 64 that mount upon circular sections 66 and 56 respectively. Bearing 64 is snugly mounted into shaft hole 134 of front plate assembly 130, and bearing 62 is snugly mounted into shaft hole 164 of rear plate assembly 160.

First vane assembly 90 comprises elongated body 92 having protruding lip 96 with distal end 98. First vane assembly 90 further comprises through hole 94. Second vane assembly 70 comprises elongated body 74 having first and second protruding lips 72 and 78 with respective first and second distal ends 82 and 80. Second vane assembly 70 further comprises through hole 76.

Casing assembly 110 houses rotor assembly 20. Casing assembly 110 comprises valve block 118 having valve receiving channel 116 of cooperative shape and dimensions to receive second vane assembly 70, whereby second vane assembly 70 swivels within valve block 118. Casing assembly 110 further comprises exterior circular surface 112 and interior circular surface 114. Casing assembly 110 further comprises bolt-holes 120 to receive plurality of stud bolts 170 therethrough.

In the preferred embodiment, instant invention 10 comprises cooling system 200 comprising front side 208 and rear side 210, and exterior surface 202 and interior surface 204. Cooling system 200 also comprises bolt-holes 206 to receive plurality of stud bolts 170 therethrough. Cooling system 200 further comprises inlet chamber 220, chamber 222, and outlet chamber 224. In cooperation with cooling system 200, front plate assembly 130 comprises inlet fitting 226 that is mounted upon inlet gasket 232, seen in FIG. 4A, and outlet fitting 228 that is mounted upon outlet gasket 230, also seen in FIG. 4A. Engine coolant, such as water or antifreeze, not seen, flows in from inlet fitting 226, through chamber 222 of cooling system 200 and out through outlet fitting 228. As in a typical automotive radiator, cooling system 200 operates as a heat exchanger to transfer thermal energy from one medium to another for the purpose of cooling instant invention 10. Cooling system 200 houses casing assembly 110.

Front plate assembly 130 comprises plate 132 having peripheral edge 146 and is mounted onto casing assembly 110 and cooling system 200 at front side 208. Front plate assembly 130 comprises intake check valve 138 mounted to intake port 139 (shown in FIGS. 3A and 4A). Intake check valve 138 allows a fuel-air mixture, not seen to be drawn in between lateral wall 22 and interior circular surface 114, defined as chamber 122 as seen in FIG. 4C. Intake check valve 138 sits upon an intake gasket. Front plate assembly 130 also comprises exhaust 140, which is always open. Exhaust 140 allows burned gases of the fuel-air mixture, not seen to escape from chamber 122. Exhaust 140 sits upon exhaust gasket 148 seen in FIG. 4A. Exhaust 140 has exhaust port 149. Front plate assembly 130 further comprises bolt-holes 144 to receive plurality of stud bolts 170 therethrough so that nuts 172 may be fixed thereon.

Ignition means ignite the fuel-air mixture in chamber 122. Such an ignition means may include spark plug 142. Spark plug 142, as traditional spark plugs, is an electrical device that fits into instant invention 10 and ignites fuels such as, the fuel-air mixture, aerosol gasoline, propane, ethanol, or hydrogen by means of an electric spark. Spark plug 142 may have an insulated center electrode that is connected by a heavily insulated wire to an ignition coil or magneto circuit on the outside, forming, with a grounded terminal on the base of the plug, and a spark gap positioned in chamber 122. Front plate assembly 130 also comprises shaft hole 134 to receive shaft 50 therethrough, and oil inlets 136 to receive oil.

Lubrication means lubricate circular interior components of instant invention 10, and specifically rotor assembly 20, lateral wall 22, and interior circular surface 114 with lubricant as rotor assembly 20 rotates with shaft 50. Such a lubricant can be oil. The lubrication means includes centrifugal forces caused by rotor assembly 20 rotating with shaft 50 to cause the lubricant entering through oil inlets 136 to seep through elongated channels 34 and 38.

Rear plate assembly 160 comprises plate 162 having peripheral edge 168 and is mounted onto casing assembly 110 and cooling system 200 at rear side 210. Rear plate assembly 160 further comprises apertures 166 of which plurality of stud bolts 170 originate from. Rear plate assembly 160 also comprises shaft hole 164 to receive shaft 50 therethrough. Although not illustrated, it is noted that shaft 50 trespasses front plate assembly 130 and rear plate assembly 160.

Figure 4A:
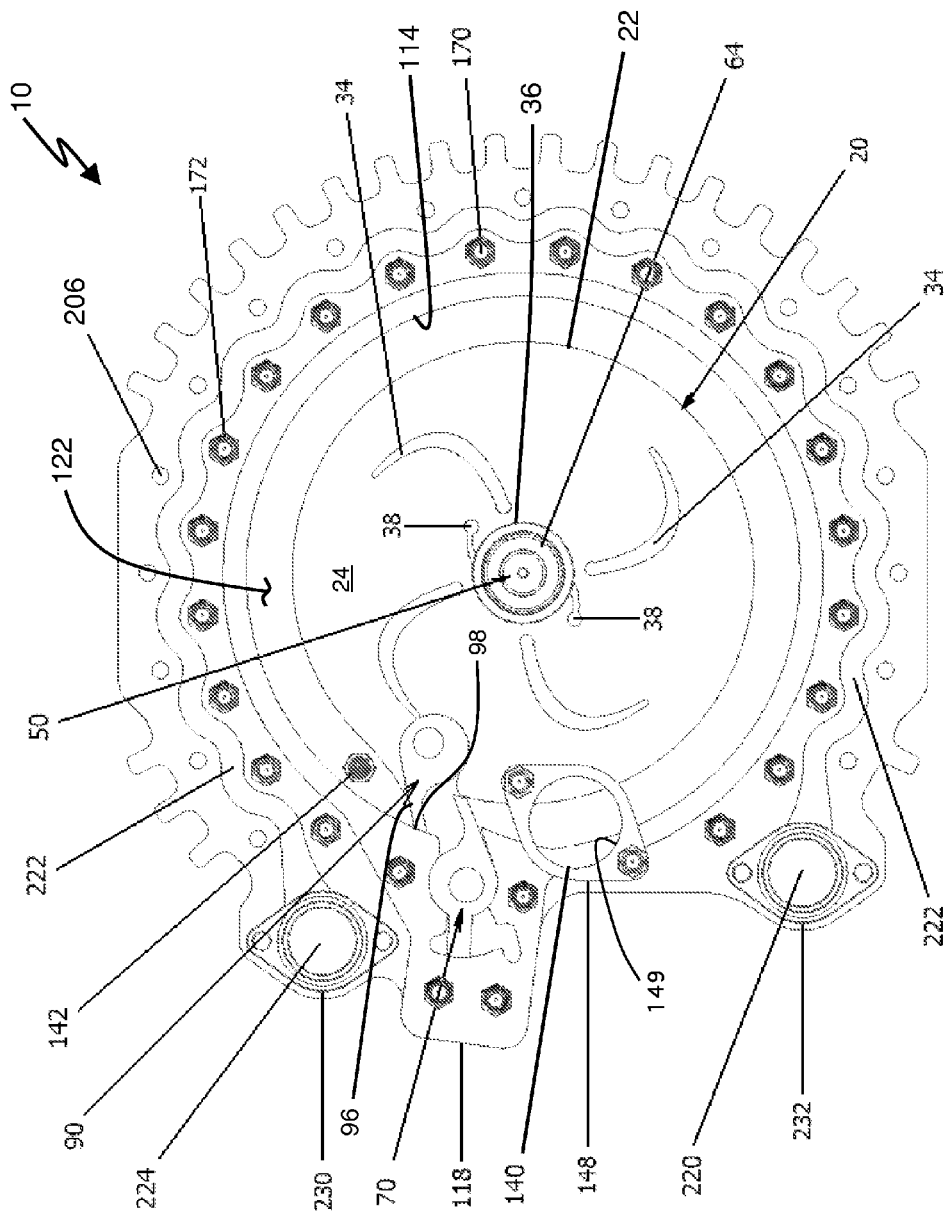
FIG. 4A is a front view of the instant invention, without the front plate assembly and showing a first vane assembly in a first position.
Figure 4B:
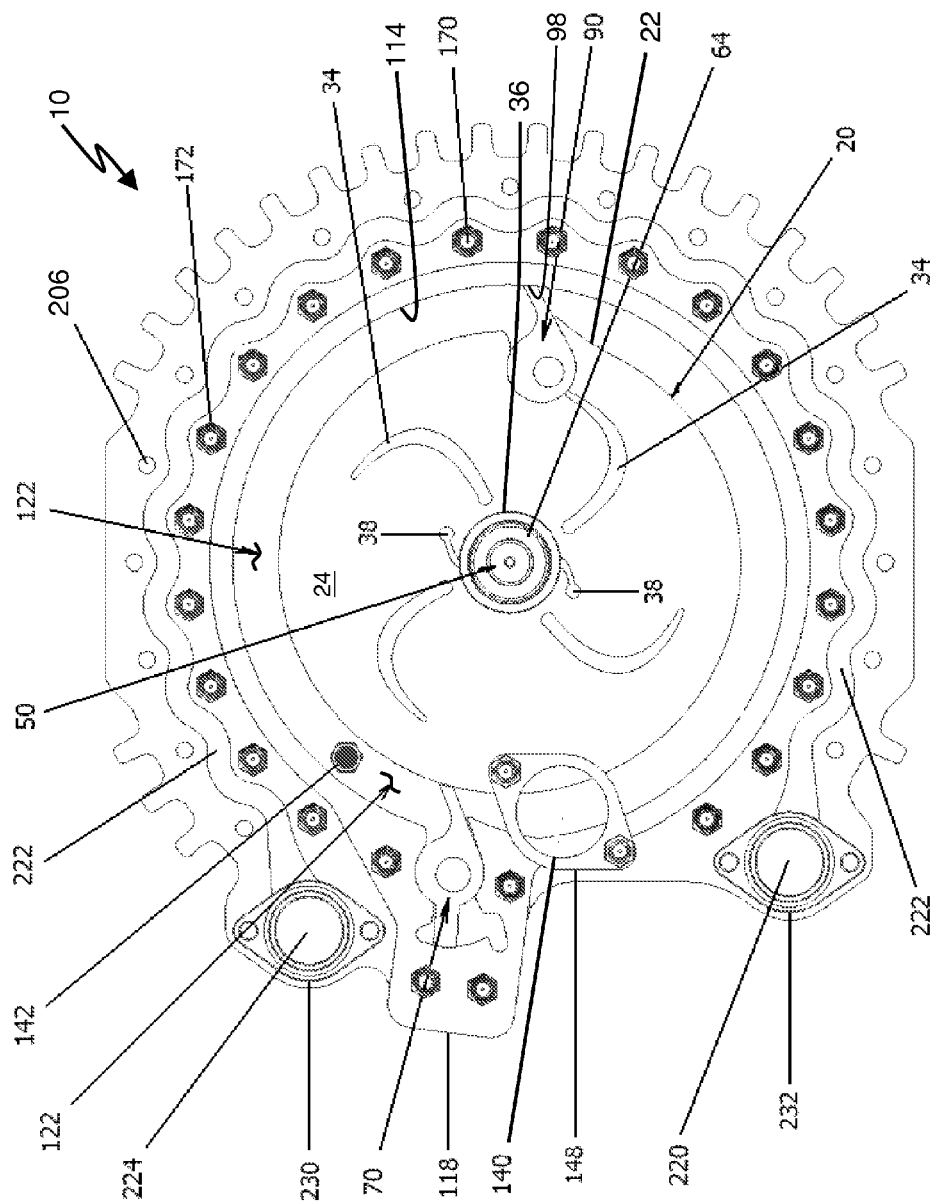
FIG. 4B is a front view of the instant invention, without the front plate assembly and showing the first vane assembly in a second position after rotating in a clockwise direction.
Figure 4C:
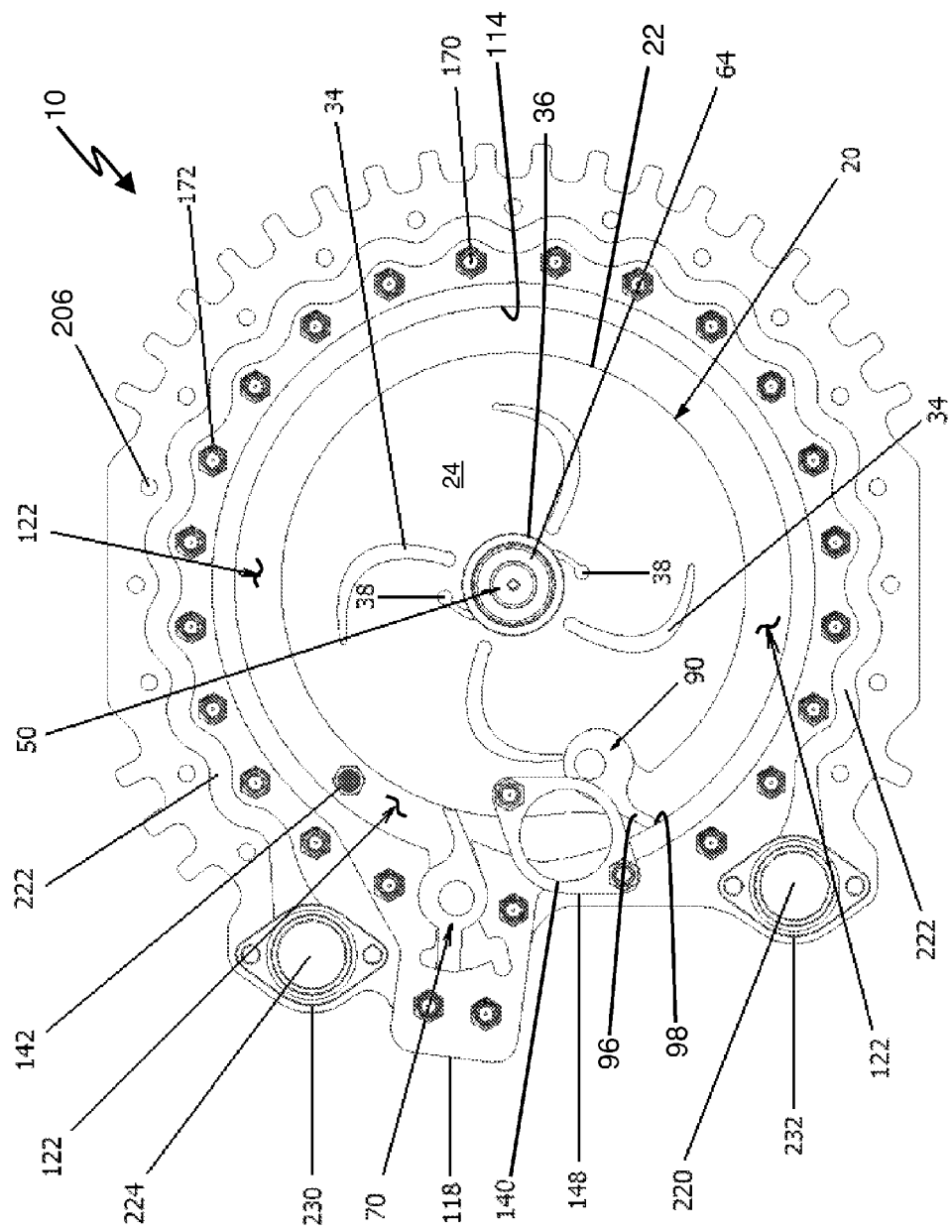
FIG. 4C is a front view of the instant invention, without the front plate assembly and showing the first vane assembly in a third position after further rotating in the clockwise direction.

As best seen in FIGS. 4A, 4B, and 4C lateral wall 22 does not contact interior circular surface 114. It is noted that distal end 98 of protruding lip 96 makes contact with interior circular surface 114. Instant invention 10 also comprises timing means to ignite the fuel-air mixture in chamber 122, whereby ignition of spark plug 142 occurs after first vane assembly 90 engages second vane assembly 70 a first time but before engaging second vane assembly 70 a second time. This process repeats to allow instant invention 10 to operate as a rotary internal combustion engine in which the combustion of the fuel-air mixture occurs with an oxidizer (usually air) in chamber 122. The expansion of the high temperature and burned gases of the fuel-air mixture that are produced by combustion caused by the ignition defined above, directly apply a rotational force to rotor assembly 20 that is transferred to shaft 50, and by rotating it, generates useful mechanical energy.

Figure 5:
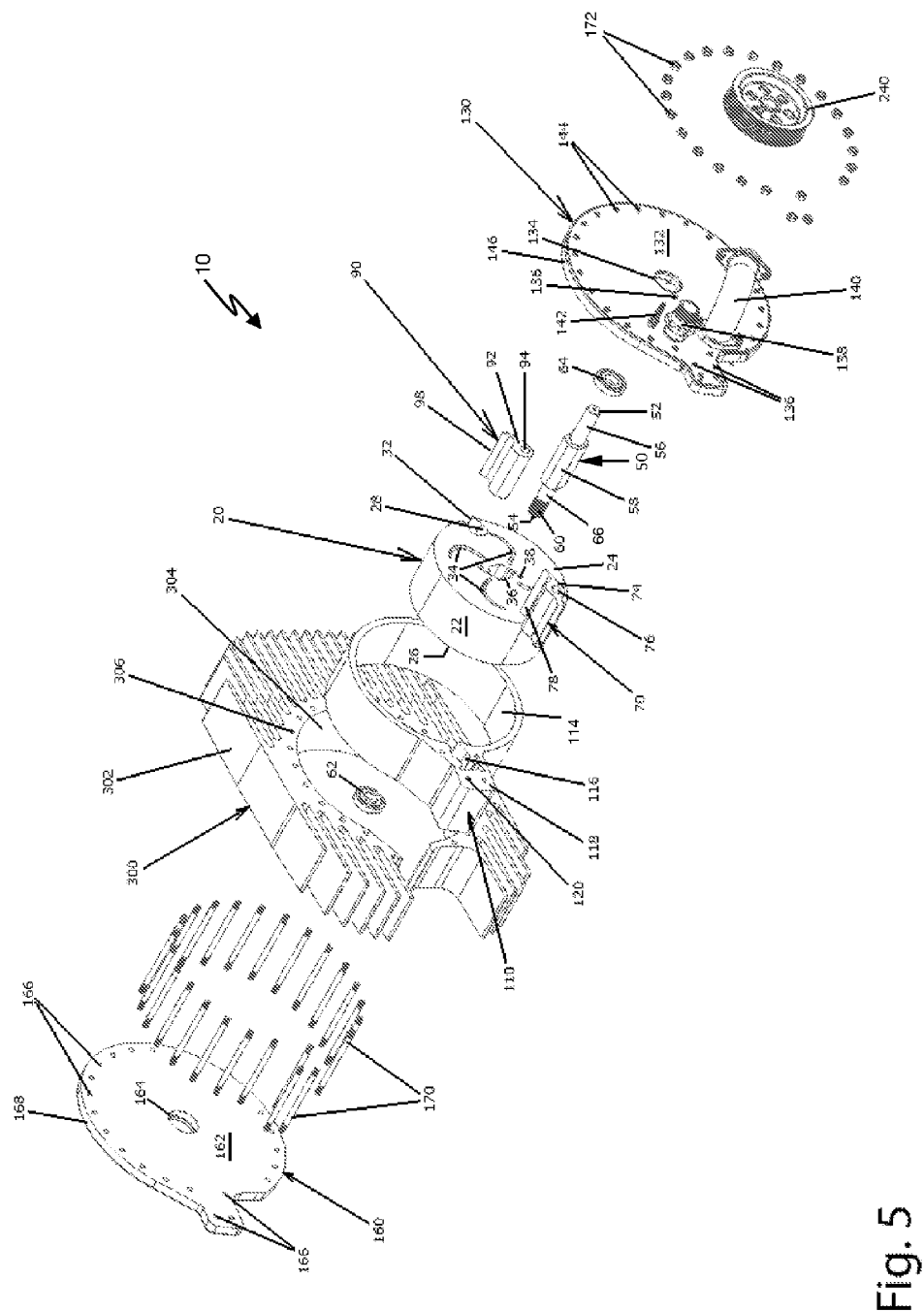
FIG. 5 is a third exploded view of the instant invention illustrating a second embodiment for a cooling system.

As seen in FIG. 5, a second embodiment for a cooling system is represented. Cooling system 300 comprises exterior surface 302, interior surface 304, and bolt-holes 306. It is noted that cooling system 300 does not utilize engine coolant as in a typical automotive radiator. However, with its plurality of fins, cooling system 300 also operates as a heat exchanger to transfer thermal energy from one medium to another for the purpose of cooling instant invention 10. Cooling system 300 houses casing assembly 110.

Figure 6:
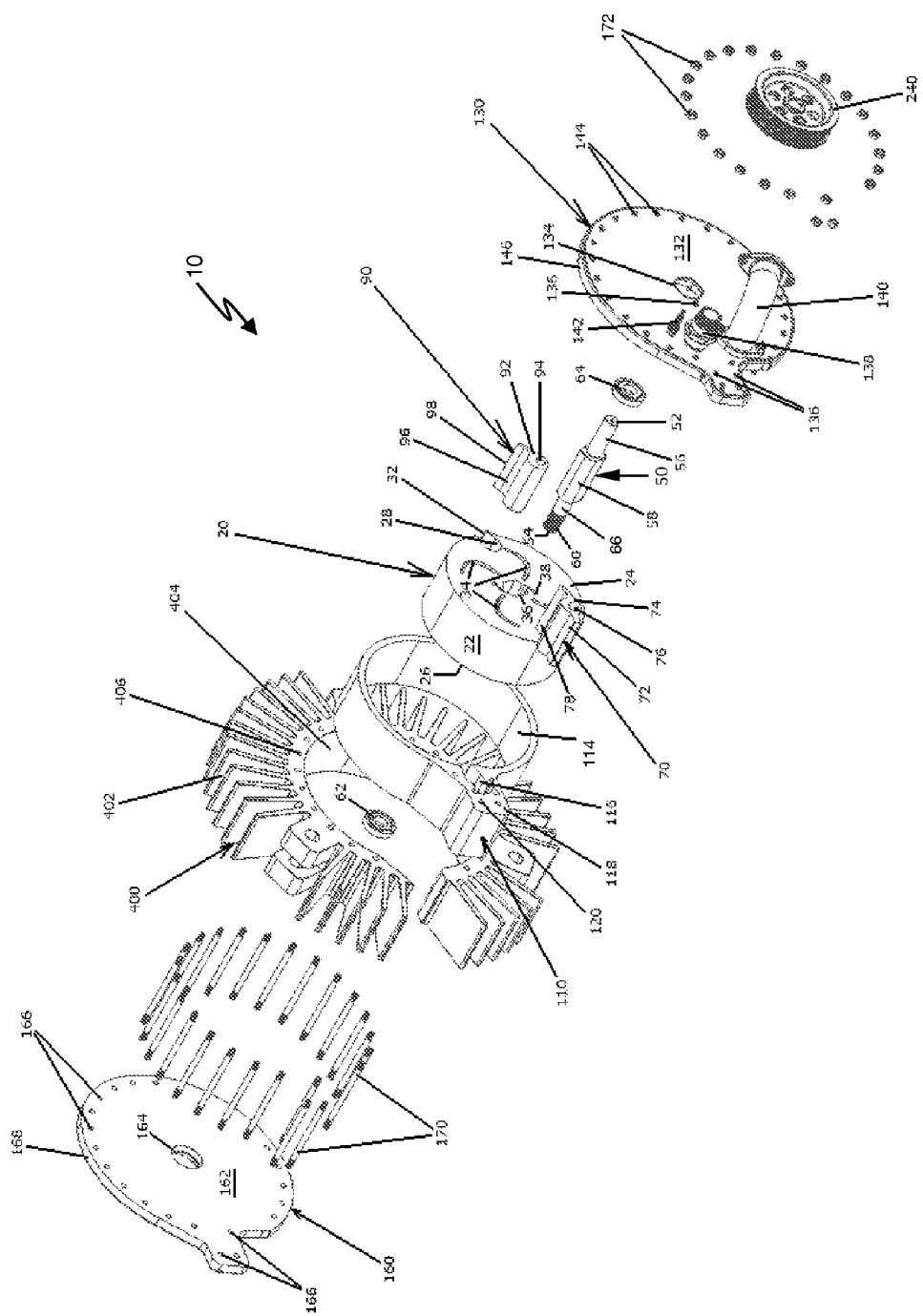
FIG. 6 is a fourth exploded view of the instant invention illustrating a third embodiment for a cooling system.

As seen in FIG. 6, a third embodiment for a cooling system is represented. Cooling system 400 comprises exterior surface 402, interior surface 404, and bolt-holes 406. It is noted that cooling system 400 does not utilize engine coolant as in a typical automotive radiator. However, with its plurality of fins, cooling system 400 also operates as a heat exchanger to transfer thermal energy from one medium to another for the purpose of cooling instant invention 10. Cooling system 400 houses casing assembly 110.

Figure 7:
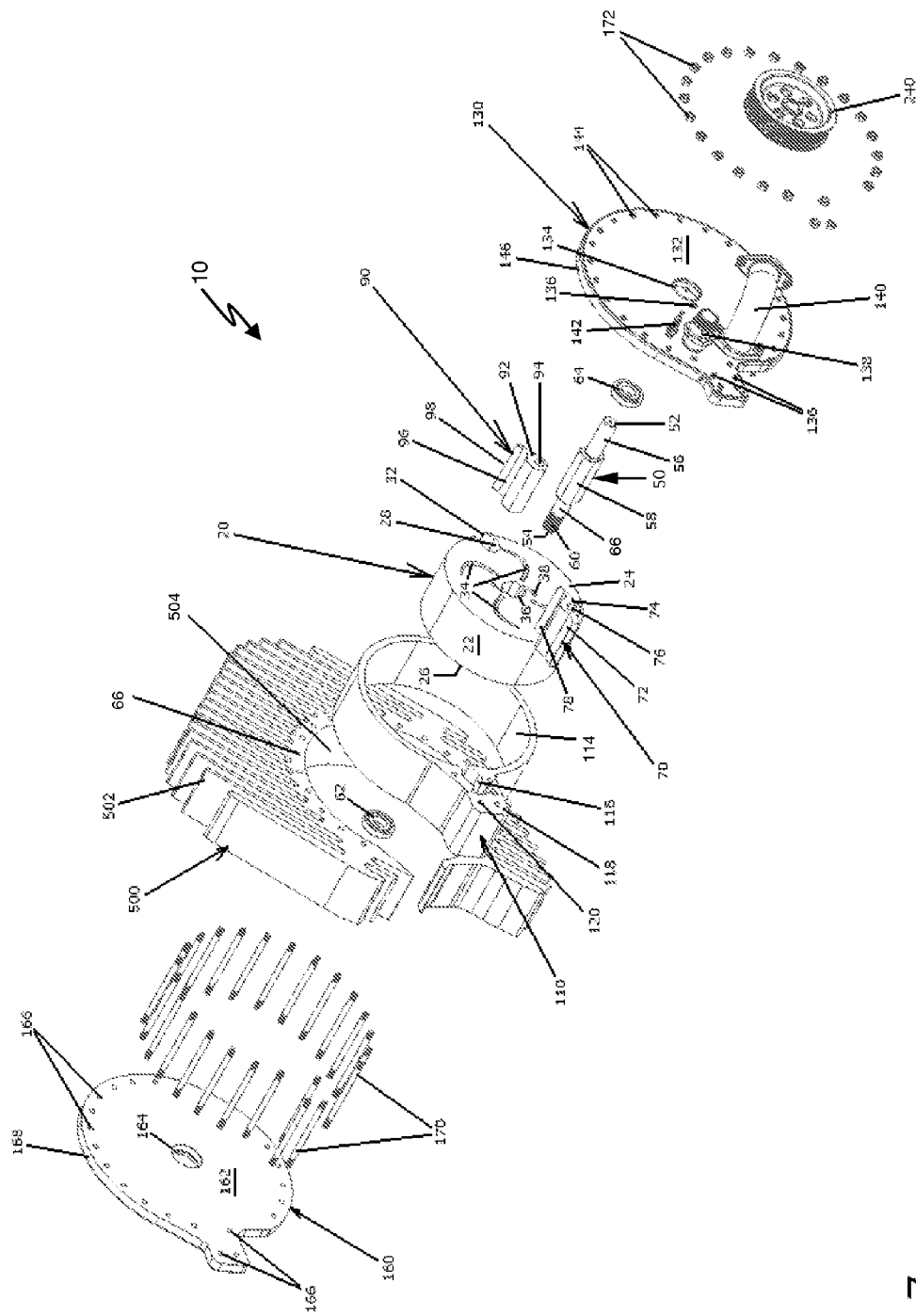
FIG. 7 is a fifth exploded view of the instant invention illustrating a fourth embodiment for a cooling system.

As seen in FIG. 7, a fourth embodiment for a cooling system is represented. Cooling system 500 comprises exterior surface 502, interior surface 504, and bolt-holes 506. It is noted that cooling system 500 does not utilize engine coolant as in a typical automotive radiator. However, with its plurality of fins, cooling system 500 also operates as a heat exchanger to transfer thermal energy from one medium to another for the purpose of cooling instant invention 10. Cooling system 500 houses casing assembly 110.

Figure 8:
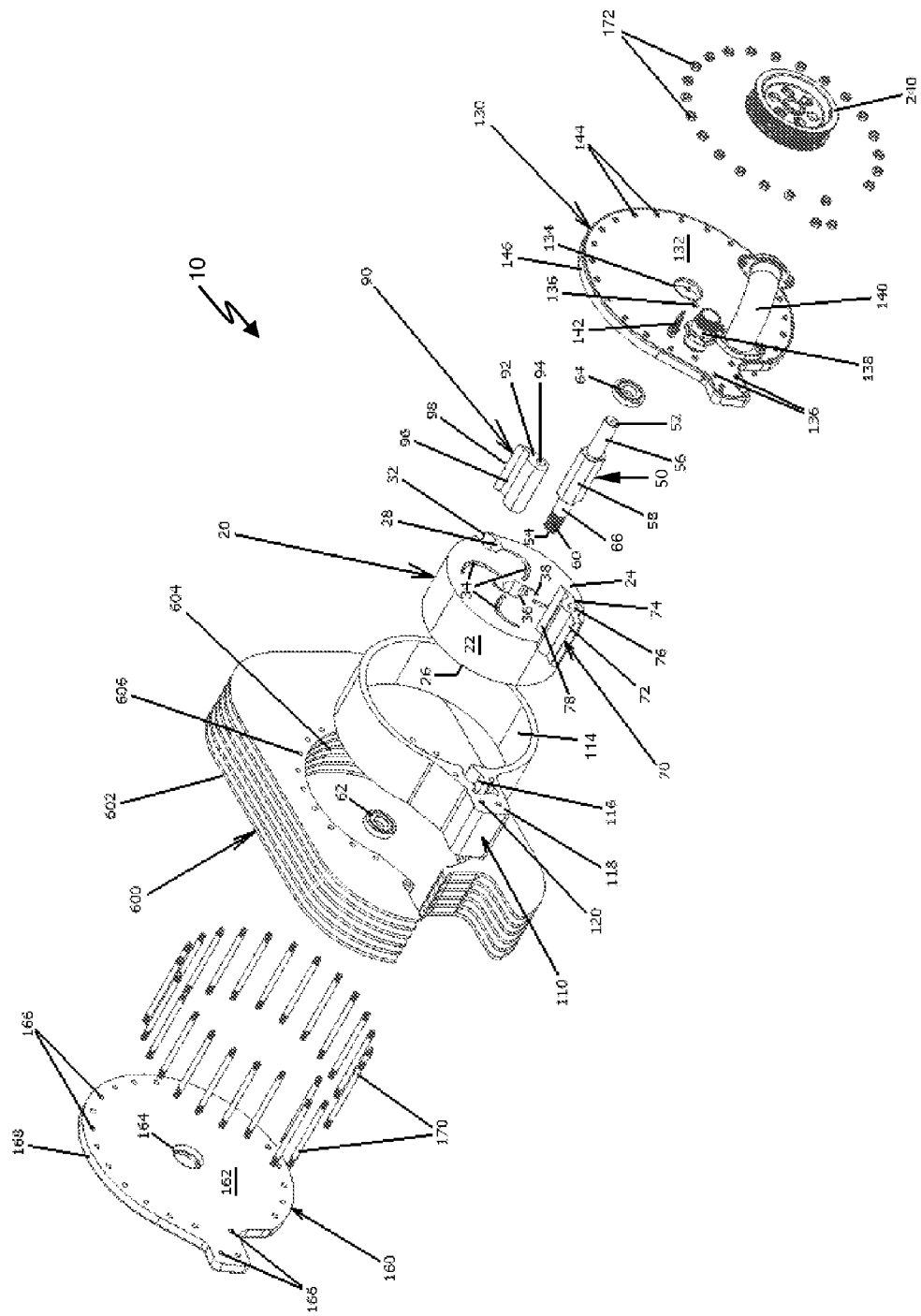
FIG. 8 is a sixth exploded view of the instant invention illustrating a fifth embodiment for a cooling system.
Figure 8A:
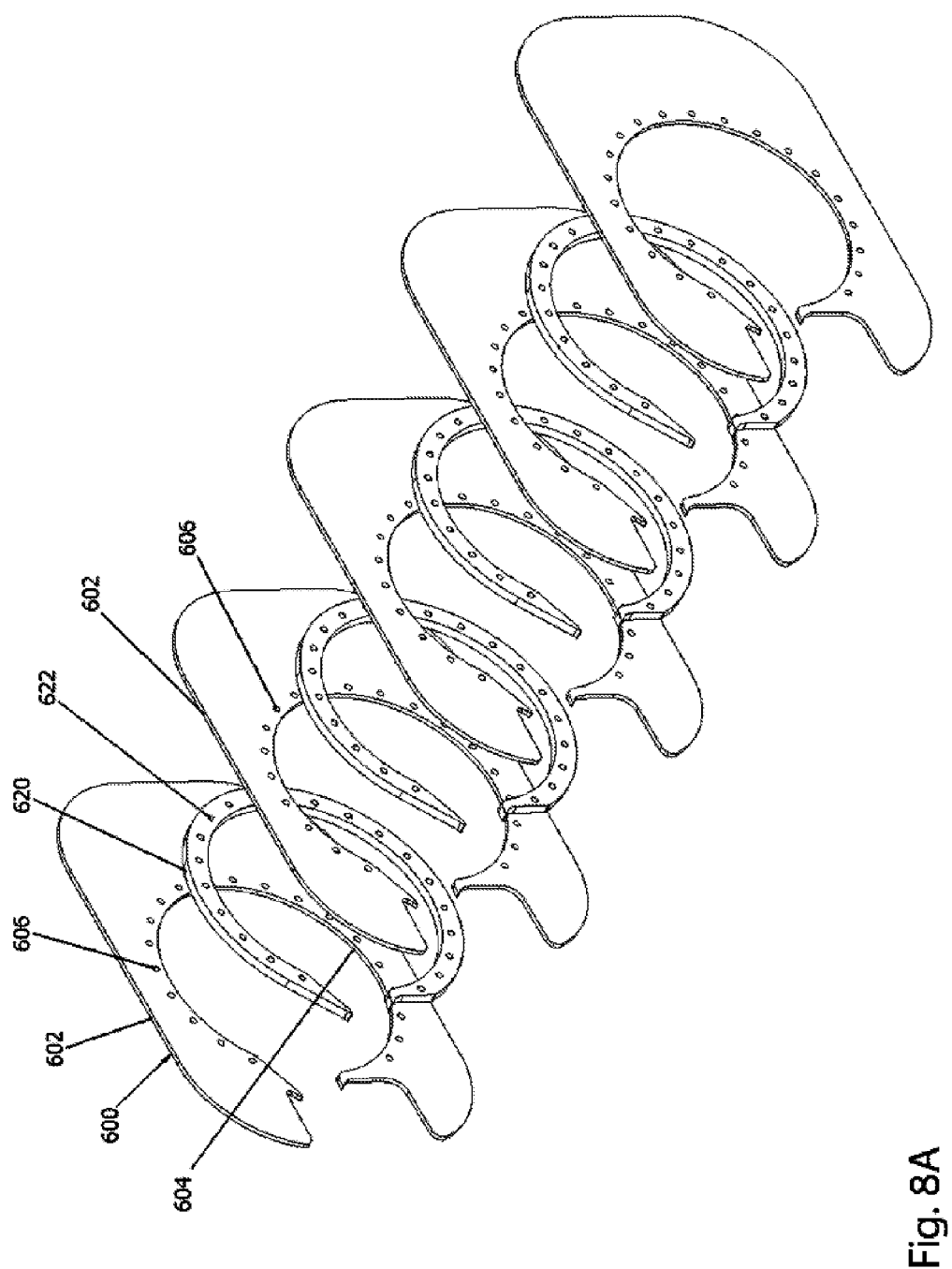
FIG. 8A is an isometric exploded view of the fifth embodiment for the cooling system shown in FIG. 8.

As seen in FIG. 8, a fifth embodiment for a cooling system is represented. Cooling system 600 comprises exterior surface 602, interior surface 604, and bolt-holes 606. It is noted that cooling system 600 does not utilize engine coolant as in a typical automotive radiator. However, with its plurality of plates, cooling system 600 also operates as a heat exchanger to transfer thermal energy from one medium to another for the purpose of cooling instant invention 10. Cooling system 600 houses casing assembly 110. As seen in FIG. 8A, cooling system 600 also comprises spacer rings 620 comprising bolt-holes 622.

Figure 9:
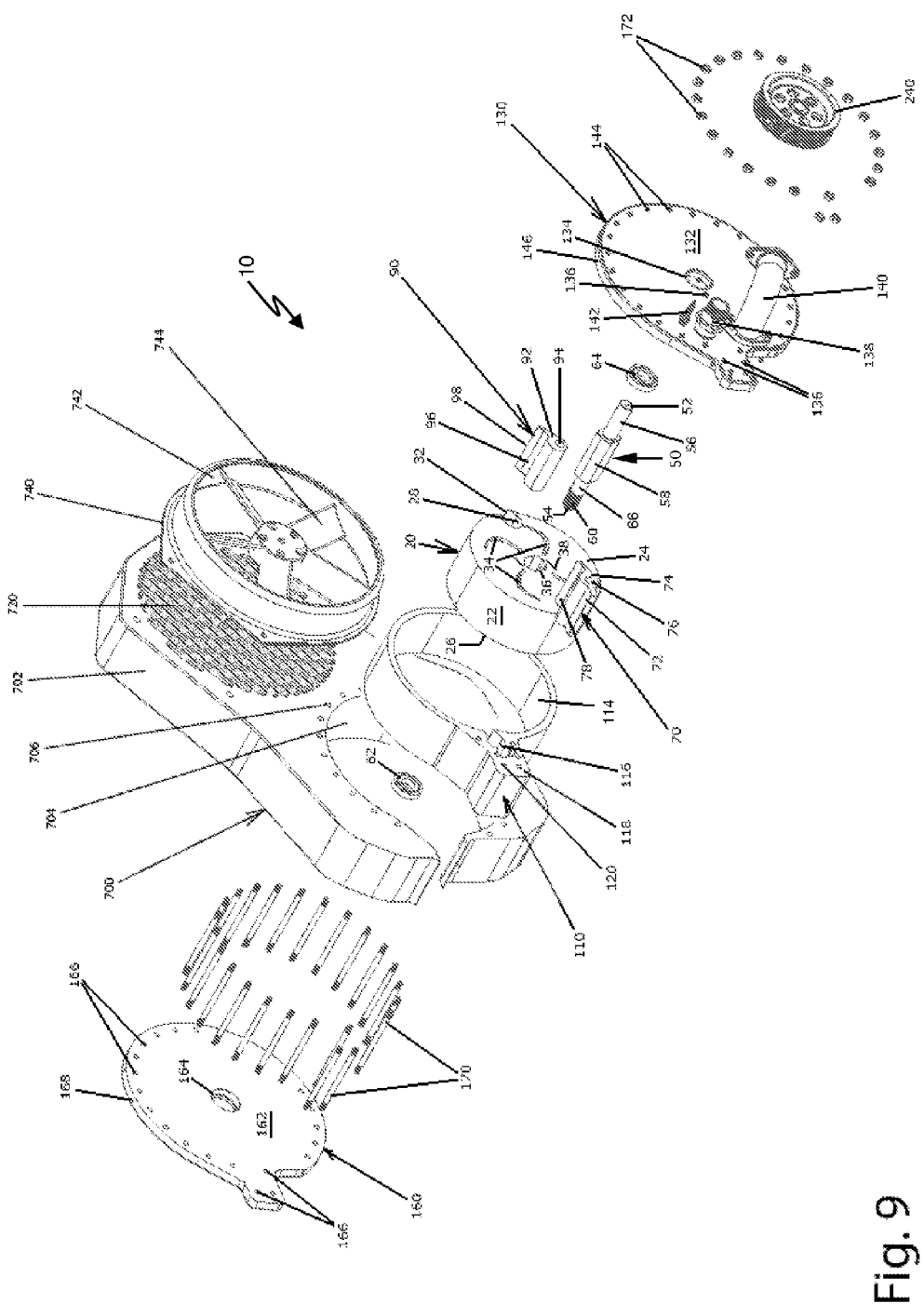
FIG. 9 is a seventh exploded view of the instant invention illustrating a sixth embodiment for a cooling system.

As seen in FIG. 9, a sixth embodiment for a cooling system is represented. Cooling system 700 comprises exterior surface 702, interior surface 704, and bolt-holes 706. It is noted that cooling system 700 does not utilize engine coolant as in a typical automotive radiator. However, with its plurality of blades 744, cooling system 700 also operates as a heat exchanger to transfer thermal energy from one medium to another for the purpose of cooling instant invention 10. Cooling system 700 houses casing assembly 110. Cooling system 700 further comprises grilled area 720, fan assembly 740, and frame 742.

Figure 10:
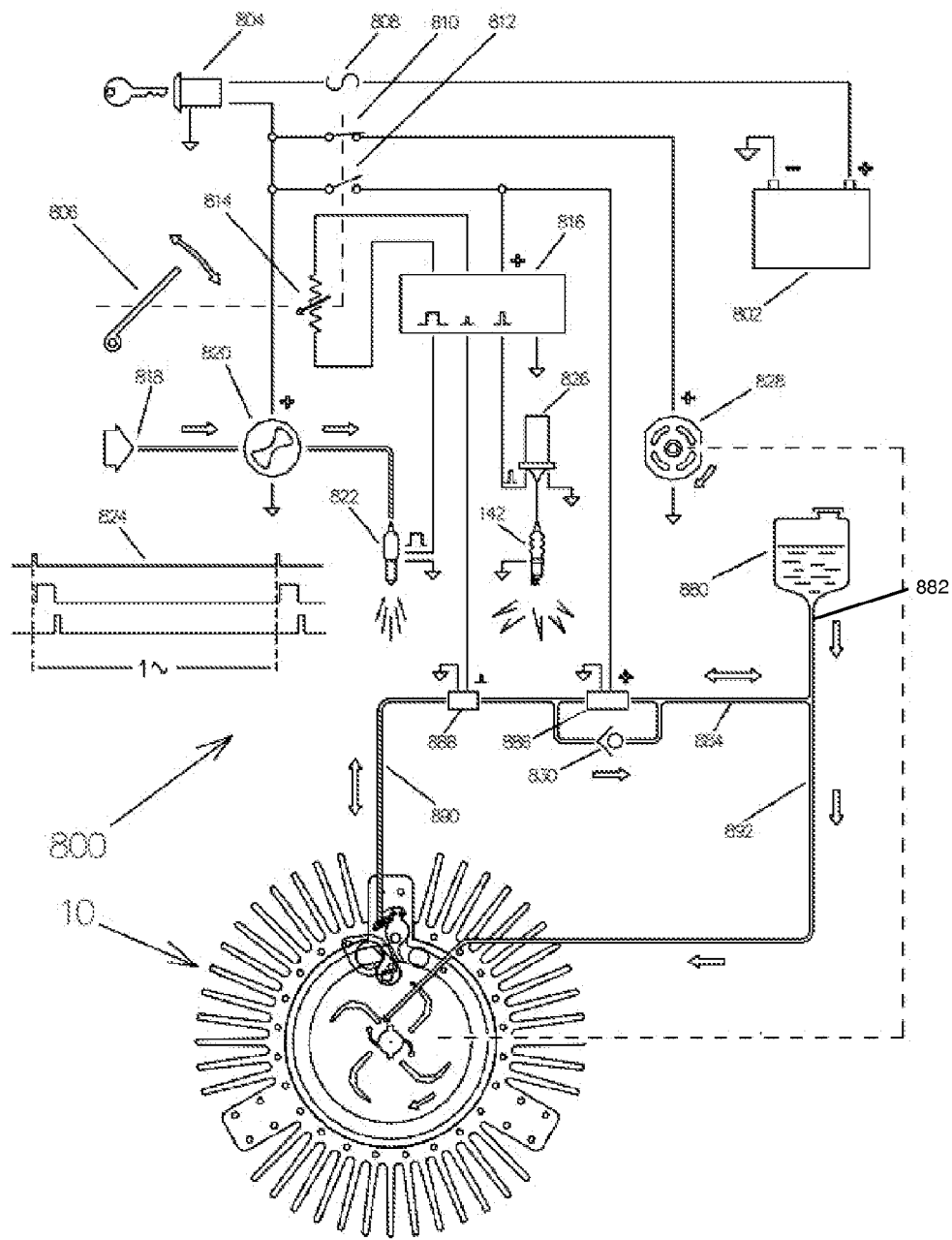
FIG. 10 is a block diagram of the instant invention and related components installed onto a vehicle.

Seen in FIG. 10 is a preferred embodiment of electrical system 800 for instant invention 10. Other embodiments of an electrical system may of course perform the required functions. Electrical system 800 comprises battery 802, ignition switch 804, accelerator 806, system fuse 808, normally closed switch A 810, normally open switch B 812, variable resister 814, pulse generator circuit 816. In operation, battery 802 is a combination of two or more cells electrically connected to work together to produce electric energy. Ignition switch 804 and system fuse 808 are electrically connected to battery 802. Accelerator 806 is a device, connected and usually operated by the foot, for controlling the speed of instant invention 10. Normally closed switch A 810 and normally open switch B 812 operate and are connected to ignition switch 804 and fuel pump 820. Variable resister 814 is an adjustable resistor used in applications that require the adjustment of current or the varying of resistance for electrical system 800 for instant invention 10. Pulse generator circuit 816 is an electrical device used as an internal source of signal for electrical system 800 for instant invention 10. Pulse generator circuit 816 also used to deliver a signal as well as to measure the amount of signal a device is receiving. It can use both digital as well as analog circuitry to generate the pulses it provides. Pulse generator circuit 816 is also capable of providing both long and short voltage pulses. The pulses generated will vary depending on the need determined by the user. Pulse generator circuit 816 are often used internally to power timed trigger devices for electrical system 800 for instant invention 10.

In continuation, electrical system 800 cooperates with main fuel intake 818, fuel pump 820, fuel injector 822, timing chart 824, ignition coil 826, idle electric motor 828, check valve 830, oil tank 880, outlet line 882, connecting line 884, hydraulic two-way valve 886, magnetic or pressure transducer 888, connecting line 890, and connecting line 892 as illustrated. In operation, main fuel intake 818 carries fuel from a fuel source, not seen, containing fuel such as aerosol gasoline, or any combustious gas such as propane, ethanol, methane, diesel, or hydrogen, or gasoline. Main fuel intake 818 connects to fuel pump 820 that connects to fuel injector 822. In a preferred embodiment fuel injector 822 is a direct fuel injector. Ignition coil 826 is connected to pulse generator circuit 816 and spark plug 142. Idle electric motor 828 is connected to normally closed switch A 810. Idle electric motor 828 is a small electric motor, controlled by electrical system 800, which lets a measured about of air into instant invention 10 at idle (when a driver's foot is not on accelerator 806), thereby controlling the idle speed. Check valve 830 connects to oil tank 880 and is a type of valve, which only permits flow in one direction, designed for safety reasons, to prevent backflow and to ensure the direction fluids and gases are flowing in. Oil tank 880 stores/contains oil. Also connected to oil tank 880 are outlet line 882, connecting line 884, hydraulic two-way valve 886, magnetic or pressure transducer 888, connecting line 890, and connecting line 892 as illustrated.

Figure 11:
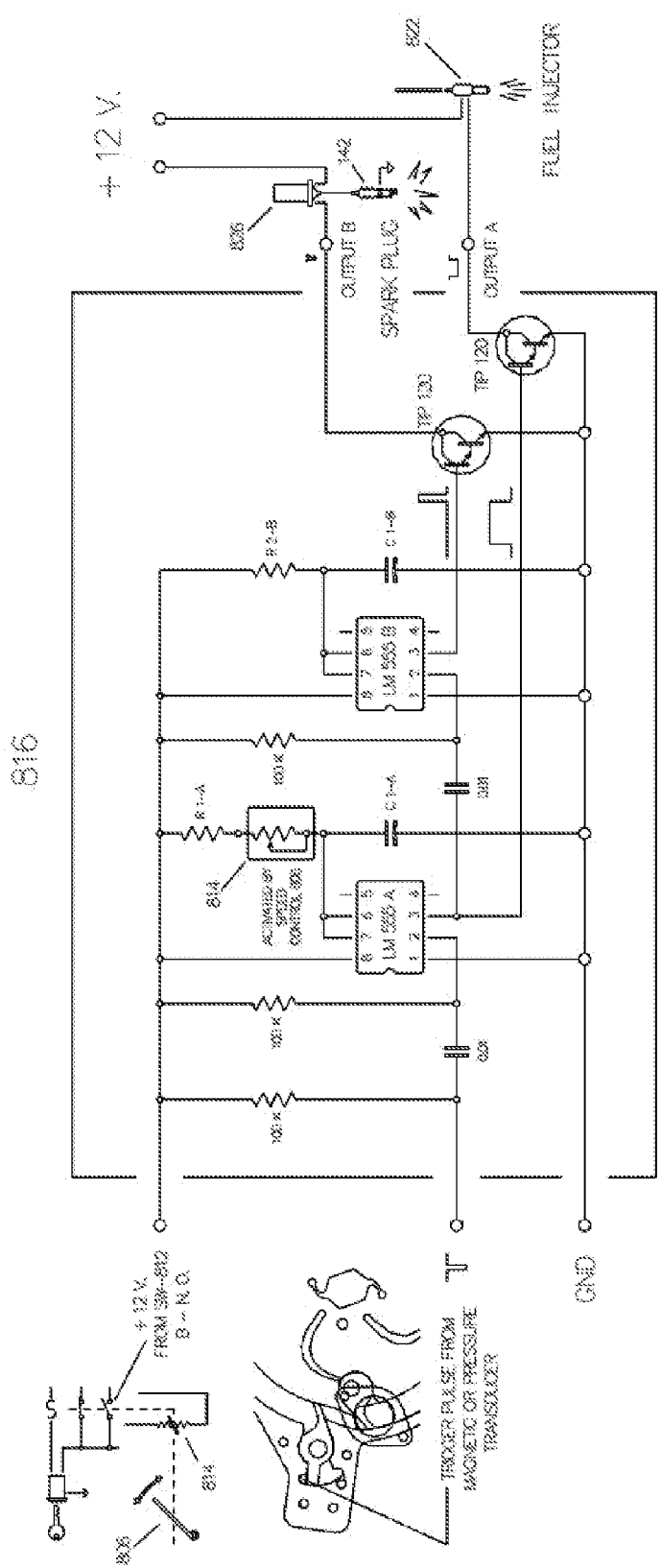
FIG. 11 is a diagram of the electrical system.

Seen in FIG. 11 is a diagram of an electrical system of present invention 10 illustrating the fact that a trigger pulse may occur from a magnetic or pressure transducer as an example.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A rotary internal combustion engine, comprising:
A) a rotor assembly, wherein said rotor assembly further comprises:
   a lateral wall extending from a first edge to a second edge,
   a front wall and a rear wall, said front and rear walls spaced apart from each other by said lateral wall,
   a central opening,
   first and second elongated channels to deliver a lubricant;
B) a shaft, said rotor assembly mounted upon said shaft through said central opening;
C) a first vane assembly;
D) a second vane assembly;
E) a casing assembly housing said rotor assembly, wherein said casing assembly comprises:
   an exterior circular surface and an interior circular surface; wherein an interior circular surface and said lateral wall defines a chamber, and
   a valve block of cooperative shape and dimensions to receive said second vane assembly;

F) a cooling system comprising first and second sides, wherein said cooling system houses said casing assembly;

G) a first plate assembly mounted onto said casing assembly and said cooling system at said first side;

H) a second plate assembly mounted onto said casing assembly and said cooling system at said second side;

I) an intake port for supplying a fuel-air mixture into said chamber,

J) an exhaust port for discharging burned gas from said chamber,

K) ignition means for igniting said fuel-air mixture in said chamber, and

L) timing means for ignition timing said fuel-air mixture in said chamber.

2. The rotary internal combustion engine set forth in claim 1, characterized in that said rotor assembly further comprises a cutout defined by said first and second edges,
wherein said cutout is of cooperative shape and dimensions to receive said first vane assembly.

3. The rotary internal combustion engine set forth in claim 2, characterized in that said first vane assembly swivels within said cutout.

4. The rotary internal combustion engine set forth in claim 1 characterized in that said first vane assembly comprises an elongated body having a protruding lip with a distal end that makes contact with said interior circular surface.

5. The rotary internal combustion engine set forth in claim 1, characterized in that said shaft has first and second ends and trespasses said first and second plate assemblies.

6. The rotary internal combustion engine set forth in claim 1 comprising an intake check valve, said intake check valve allowing said fuel-air mixture to be drawn in said chamber via said intake port.

7. The rotary internal combustion engine set forth in claim 1 characterized in that said timing means ignites said fuel-air mixture in said chamber after said first vane assembly engages said second vane assembly a first time but before engaging said second vane assembly a second time and repeating.

8. The rotary internal combustion engine set forth in claim 1, characterized in that said second vane assembly swivels within said valve block.

9. The rotary internal combustion engine set forth in claim 1, characterized in that said shaft comprises a first non-circular section that matches a second non-circular section of said rotor assembly.

10. The rotary internal combustion engine set forth in claim 1, comprising lubrication means to lubricate said rotor assembly, said lateral wall, and said interior circular surface with said lubricant as said rotor assembly rotates with said shaft.

11. The rotary internal combustion engine set forth in claim 10, characterized in that said lubrication means includes centrifugal forces caused by said rotor assembly rotating with said shaft to cause said lubricant entering through an oil inlet to seep through said first and second elongated channels.

12. The rotary internal combustion engine set forth in claim 1, characterized in that said first vane assembly comprises an elongated body having a protruding lip with a distal end.

13. The rotary internal combustion engine set forth in claim 1, characterized in that said second vane assembly comprises a first elongated body having first and second protruding lips with respective first and second distal ends.

14. A rotary internal combustion engine, comprising:
A) a rotor assembly, wherein said rotor assembly further comprises:
a lateral wall extending from a first edge to a second edge,
a front wall and a rear wall, said front and rear walls spaced apart from each other by said lateral wall,
a central opening, and
first and second elongated channels to deliver a lubricant;
B) a shaft, said rotor assembly mounted upon said shaft through said central opening;
C) a first vane assembly,
wherein said rotor assembly further comprises a cutout defined by said first and second edges,
wherein said cutout is of cooperative shape and dimensions to receive said first vane assembly;
D) a second vane assembly;
E) a casing assembly housing said rotor assembly, wherein said casing assembly comprises:
an exterior circular surface and an interior circular surface; wherein an interior circular surface and said lateral wall defines a chamber, and
a valve block of cooperative shape and dimensions to receive said second vane assembly;
F) a cooling system comprising first and second sides, wherein said cooling system houses said casing assembly;
G) a first plate assembly mounted onto said casing assembly and said cooling system at said first side;
H) a second plate assembly mounted onto said casing assembly and said cooling system at said second side;
I) an intake port for supplying a fuel-air mixture into said chamber,
J) an exhaust port for discharging burned gas from said chamber,
K) ignition means for igniting said fuel-air mixture in said chamber, and
L) timing means for ignition timing said fuel-air mixture in said chamber.

15. The rotary internal combustion engine set forth in claim 13 characterized in that:
said first vane assembly comprises an elongated body having a protruding lip with a distal end that makes contact with said interior circular surface, and
said first vane assembly swivels within said cutout, and said second vane assembly swivels within said valve block.

* * * * *